US009215264B1

(12) United States Patent
Sokolov et al.

(10) Patent No.: US 9,215,264 B1
(45) Date of Patent: Dec. 15, 2015

(54) TECHNIQUES FOR MONITORING SECURE CLOUD BASED CONTENT

(75) Inventors: Ilya Sokolov, Boston, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 678 days.

(21) Appl. No.: 12/860,551

(22) Filed: Aug. 20, 2010

(51) Int. Cl.
*H04L 12/26* (2006.01)
*H04L 29/08* (2006.01)

(52) U.S. Cl.
CPC .............. *H04L 67/02* (2013.01); *H04L 12/26* (2013.01)

(58) Field of Classification Search
USPC ................................................ 709/223–225
See application file for complete search history.

(56) References Cited

U.S. PATENT DOCUMENTS

| | | | |
|---|---|---|---|
| 6,185,567 B1* | 2/2001 | Ratnaraj et al. ........................ 1/1 |
| 6,745,367 B1* | 6/2004 | Bates et al. .................... 715/205 |
| 6,842,770 B1* | 1/2005 | Serlet et al. .................... 709/203 |
| 6,892,347 B1* | 5/2005 | Williams et al. .............. 715/201 |
| 7,046,139 B2* | 5/2006 | Kuhn et al. .............. 340/539.15 |
| 7,756,987 B2* | 7/2010 | Wang et al. .................... 709/229 |
| 8,145,762 B2* | 3/2012 | Barber .......................... 709/226 |
| 8,694,686 B2* | 4/2014 | Roth et al. .................... 709/248 |
| 8,799,221 B2* | 8/2014 | Canessa et al. ............... 707/638 |
| 8,990,105 B1* | 3/2015 | Shatkin-Margolis et al. ........................... 705/14.54 |
| 2002/0184620 A1* | 12/2002 | Davies et al. .................... 725/25 |
| 2004/0103122 A1* | 5/2004 | Irving et al. .................. 707/200 |
| 2004/0224771 A1* | 11/2004 | Chen et al. ...................... 463/42 |
| 2005/0240959 A1* | 10/2005 | Kuhn et al. ...................... 725/25 |
| 2006/0036565 A1* | 2/2006 | Bruecken .......................... 707/1 |
| 2006/0101139 A1* | 5/2006 | Hornreich et al. ............ 709/224 |
| 2006/0168547 A1* | 7/2006 | Boyles et al. ................. 715/854 |
| 2006/0218575 A1* | 9/2006 | Blair .............................. 725/28 |
| 2007/0245032 A1* | 10/2007 | KishorVarshney et al. ... 709/229 |
| 2008/0091610 A1* | 4/2008 | Benjamin ....................... 705/52 |
| 2008/0270240 A1* | 10/2008 | Chu ............................... 705/14 |
| 2009/0174551 A1* | 7/2009 | Quinn et al. .................. 340/540 |
| 2009/0183226 A1* | 7/2009 | Dean et al. ....................... 726/1 |
| 2009/0193079 A1* | 7/2009 | Gupta et al. .................. 709/204 |
| 2009/0248508 A1* | 10/2009 | Hamaoui et al. ................ 705/14 |
| 2009/0249440 A1* | 10/2009 | Platt et al. ......................... 726/1 |
| 2009/0254656 A1* | 10/2009 | Vignisson et al. ............ 709/224 |
| 2009/0287657 A1* | 11/2009 | Bennett ............................ 707/3 |
| 2010/0112986 A1* | 5/2010 | Ellingham et al. ......... 455/414.1 |
| 2010/0153539 A1* | 6/2010 | Zarroli et al. ................. 709/224 |
| 2010/0223169 A1* | 9/2010 | Serio .............................. 705/30 |
| 2010/0223364 A1* | 9/2010 | Wei ............................... 709/220 |
| 2010/0251329 A1* | 9/2010 | Wei ................................. 726/1 |
| 2010/0306524 A1* | 12/2010 | Runkis et al. ................. 713/150 |
| 2010/0332818 A1* | 12/2010 | Prahlad et al. ................ 713/150 |

(Continued)

OTHER PUBLICATIONS

[content] watch™ Internet Protection; Net Nanny User Guide; ContentWatch, Inc.; Jan. 2010; pp. 1-107; found at http://www.netnanny.com/documentation/protect/cpuserduide_current.pdf.

*Primary Examiner* — Backhean Tiv
(74) *Attorney, Agent, or Firm* — Wilmer Cutler Pickering Hale and Dorr LLP (57) ABSTRACT

Techniques for monitoring secure cloud based content are disclosed. In one particular exemplary embodiment, the techniques may be realized as a method for monitoring secure cloud based content comprising monitoring, using a browser component, a secure session accessing cloud based content, the monitoring capable of accessing content other than content requested by a user of the browser, identifying content meeting a specified criteria, and performing a specified action based at least in part on the identified content.

20 Claims, 4 Drawing Sheets

(56) References Cited

U.S. PATENT DOCUMENTS

| | | |
|---|---|---|
| 2011/0078232 A1* | 3/2011 | Van Den Driessche ...... 709/203 |
| 2011/0131499 A1* | 6/2011 | Ferris et al. .................. 715/736 |
| 2011/0161172 A1* | 6/2011 | Lee ............................ 705/14.55 |
| 2011/0184886 A1* | 7/2011 | Shoham ....................... 705/400 |
| 2011/0214163 A1* | 9/2011 | Smith et al. ....................... 726/4 |
| 2011/0231280 A1* | 9/2011 | Farah .......................... 705/26.8 |
| 2011/0289134 A1* | 11/2011 | De Los Reyes et al. ....... 709/203 |
| 2011/0302144 A1* | 12/2011 | Hamilton et al. ............. 707/705 |
| 2011/0302633 A1* | 12/2011 | Windschauer .................... 726/4 |
| 2012/0005252 A1* | 1/2012 | Canessa et al. ............... 709/201 |
| 2012/0016977 A1* | 1/2012 | Robertson et al. ............ 709/224 |
| 2012/0158875 A1* | 6/2012 | Almeida ....................... 709/206 |
| 2012/0296977 A1* | 11/2012 | Ellison et al. ................. 709/204 |
| 2013/0054732 A1* | 2/2013 | Serlet et al. .................. 709/213 |
| 2013/0103736 A1* | 4/2013 | Domsalla ..................... 709/203 |

* cited by examiner

TECHNIQUES FOR MONITORING SECURE CLOUD BASED CONTENT

FIELD OF THE DISCLOSURE

The present disclosure relates generally to monitoring content and, more particularly, to techniques for monitoring secure cloud based content.

BACKGROUND OF THE DISCLOSURE

More data is moving online into secure cloud based environments. Meanwhile, social networking applications and other network accessible applications have an increasing number of users. Monitoring such applications may be restricted by the storage of data in a secure cloud based environment. That is, such data is difficult to monitor for security purposes or for objectionable content. Also, data may be encrypted and access to such data via a user's account may not be possible or practical.

In view of the foregoing, it may be understood that there may be significant problems and shortcomings associated with current technologies for monitoring cloud based content.

SUMMARY OF THE DISCLOSURE

Techniques for monitoring secure cloud based content are disclosed. In one particular exemplary embodiment, the techniques may be realized as a method for monitoring secure cloud based content comprising monitoring, using a browser component, a secure session accessing cloud based content, the monitoring capable of accessing content other than content requested by a user of the browser, identifying content meeting a specified criteria, and performing a specified action based at least in part on the identified content.

In accordance with other aspects of this particular exemplary embodiment, the browser component may monitor the secure session by creating a hidden inline frame in a Web document of the browser.

In accordance with further aspects of this particular exemplary embodiment, the monitoring may be performed without periodic authorization of a user of the browser.

In accordance with additional aspects of this particular exemplary embodiment, the monitoring of the secure session may be performed using a same connection created by a user of the browser.

In accordance with additional aspects of this particular exemplary embodiment, the browser component may comprise a browser plug-in.

In accordance with additional aspects of this particular exemplary embodiment, identifying content meeting a specified criteria may comprise identifying content matching one or more of: a malware signature, a blacklisted network address, a footprint, reputation based analysis, objectionable content restrictions, and behavioral analysis.

In accordance with additional aspects of this particular exemplary embodiment, identifying content meeting a specified criteria may comprise identifying a content provider for which one or more specified actions are provided.

In accordance with additional aspects of this particular exemplary embodiment, the content provider may comprise at least one of: a social networking site, an online gaming site, and an e-commerce site.

In accordance with additional aspects of this particular exemplary embodiment, the specified action may comprise collecting secure content specific to the identified content provider.

In accordance with additional aspects of this particular exemplary embodiment, the one or more specified actions may comprise at least one of collecting profile information from a social networking site, collecting age information from a social networking site, collecting lists of friends, collecting chat conversations, blocking a communication, blocking an action, emulating a user action, logging an action, and providing a notification.

In accordance with additional aspects of this particular exemplary embodiment, emulating a user action may comprise at least one of uninstalling a user application, unsubscribing from a list, unsubscribing from a group, blocking a communication, modifying a privacy setting, modifying an access setting, modifying a friends list, and modifying a contacts list.

In accordance with additional aspects of this particular exemplary embodiment, identification of a content provider with one or more specified actions may be performed using a site signature, the site signature providing one or more content provider site identifiers and one or more actions.

In accordance with additional aspects of this particular exemplary embodiment, the techniques may further comprise receiving one or more site signatures from a remote host.

In accordance with additional aspects of this particular exemplary embodiment, the one or more specified actions may include logging secure cloud based content and providing one or more portions to a remote host.

In accordance with additional aspects of this particular exemplary embodiment, the specified action may be specified by at least one of: a parent, a guardian, and an administrator.

In accordance with additional aspects of this particular exemplary embodiment, the monitoring may be performed at least one of: periodic intervals and based on usage.

In accordance with additional aspects of this particular exemplary embodiment, the techniques may further comprise in the event the cloud based content is associated with a content provider for which no specified actions are provided, one or more portions of the cloud based content may be provided to a remote host for analysis.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process.

In another particular exemplary embodiment, the techniques may be realized as a an article of manufacture for monitoring secure cloud based content, the article of manufacture comprising at least one non-transitory processor readable medium, and instructions stored on the at least one medium, wherein the instructions are configured to be readable from the at least one medium by at least one processor and thereby cause the at least one processor to operate so as to monitor, using a browser component, a secure session accessing cloud based content, the monitoring capable of accessing content other than content requested by a user of the browser, identify content meeting a specified criteria, and perform a specified action based at least in part on the identified content.

In yet another particular exemplary embodiment, the techniques may be realized as a system for monitoring secure cloud based content comprising one or more processors communicatively coupled to a network, wherein the one or more processors are configured to monitor, using a browser component, a secure session accessing cloud based content, the monitoring capable of accessing content other than content requested by a user of the browser, identify content meeting a specified criteria, and perform a specified action based at least in part on the identified content.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
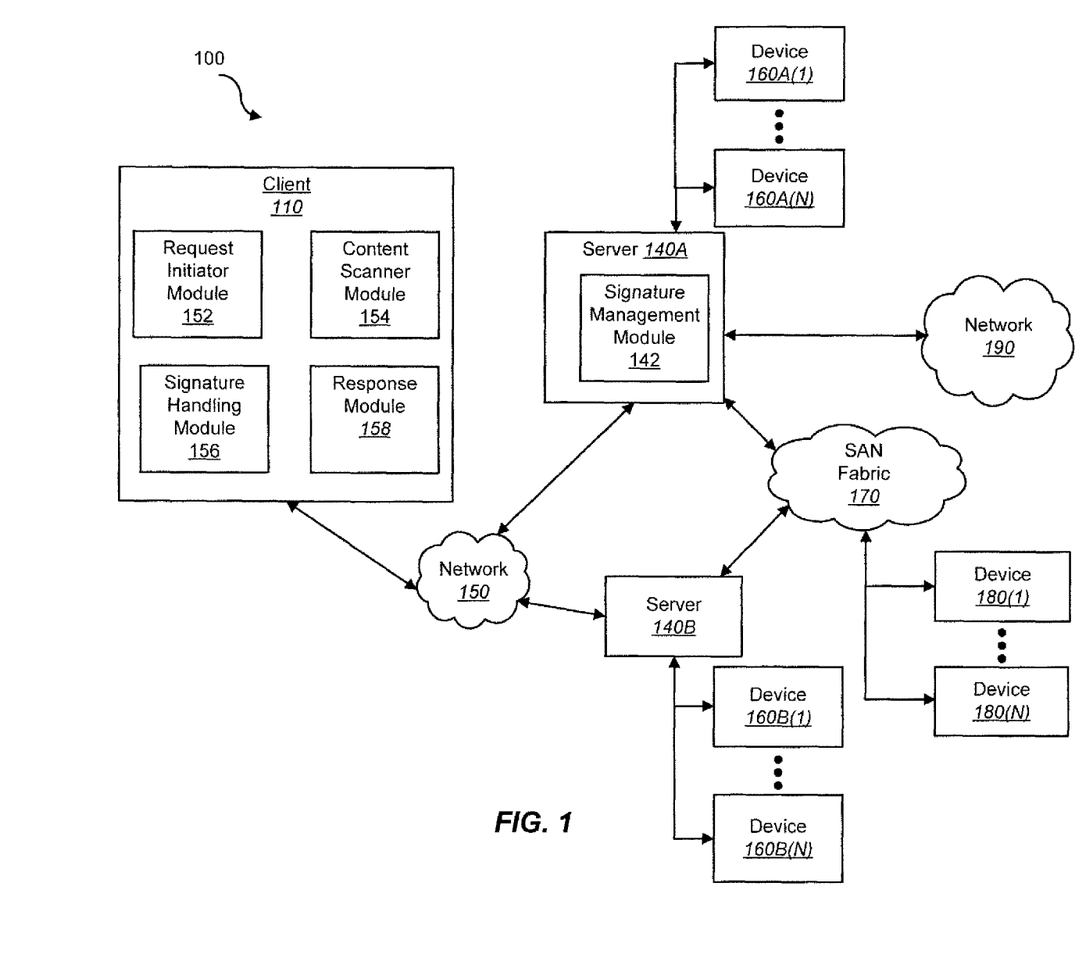
FIG. 1 shows a block diagram depicting a network architecture containing a platform for monitoring cloud based content in accordance with an embodiment of the present disclosure.

FIG. 1 shows a block diagram depicting a network architecture 100 for monitoring cloud based content in accordance with an embodiment of the present disclosure. Figure is a simplified view of network architecture 100, which may include additional elements that are not depicted.

The description below describes network elements, computers, and/or components of a system and method for monitoring cloud based content that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
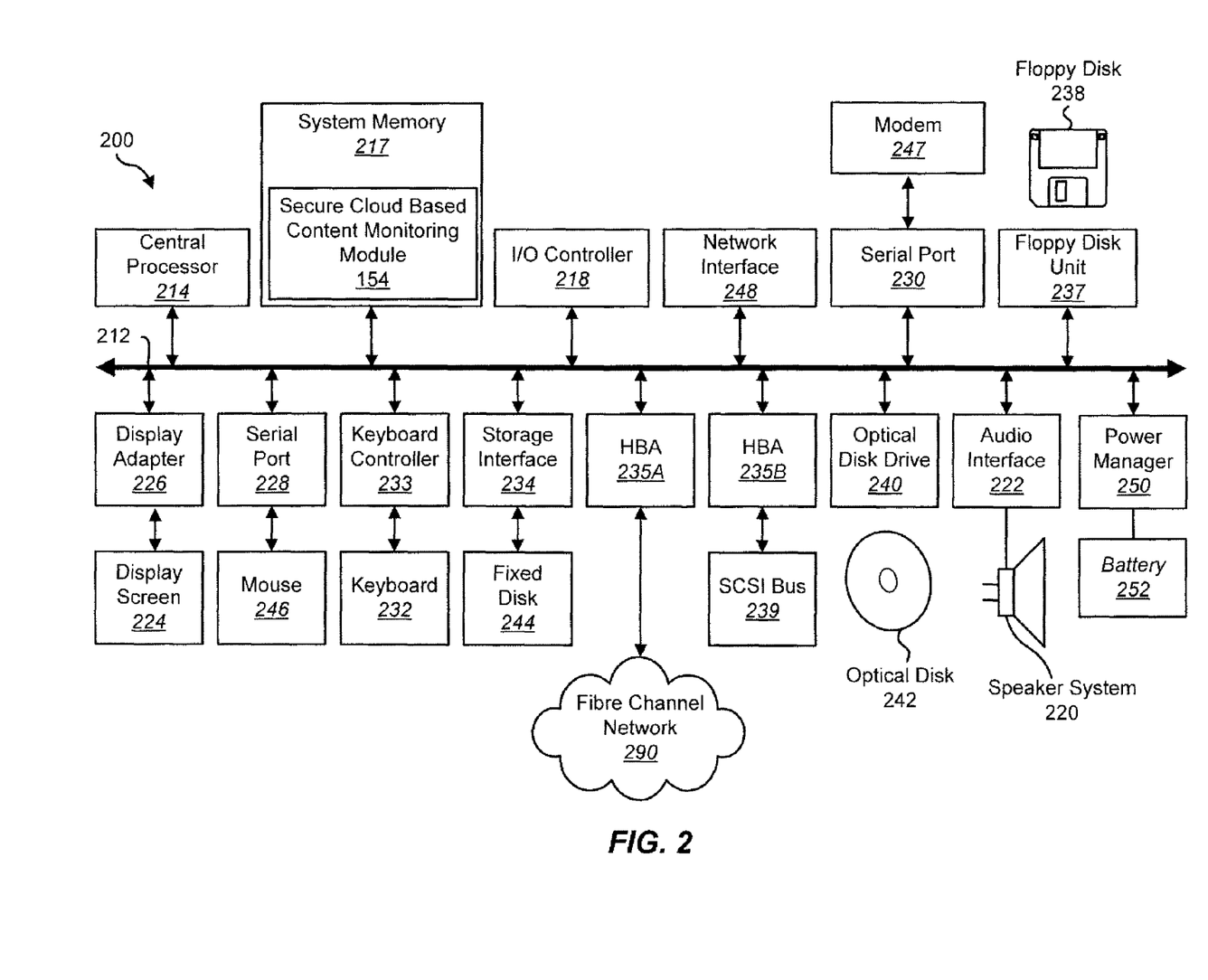
FIG. 2 depicts a block diagram of a computer system in accordance with an embodiment of the present disclosure.

Network architecture 100 may contain client system 110 as well as servers 140A and 140B (one or more of which may be implemented using computer system 200 shown in FIG. 2). Client system 110 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., signature management module 142 of server 140A). Servers 140A and 140B may be communicatively coupled to a SAN (Storage Area Network) fabric 170. SAN fabric 170 may support access to storage devices 180(1)-(N) by servers 140A and 140B, and by client system 110 via network 150. Server 140A may be communicatively coupled to network 190. Client 110 may contain one or more modules for monitoring secure cloud based content including request initiator module 152, content scanner module 154, signature handling module 156, and response module 158.

With reference to computer system 200 of FIG. 2, modem 247, network interface 248, or some other method may be used to provide connectivity from one or more of client system 110 to network 150. Client system 110 may be able to access information on server 140A or 140B using, for example, a web browser or other client software. Such a client may allow client system 110 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client 110 and a backup platform, a backup process, and/or storage. According to some embodiments, servers 140A and 140B may be platforms used for backing up and/or archiving data.

Request initiator module 152 may begin a process of scanning secure cloud based content. According to some embodiments, request initiator module 152 may be implemented using a browser plug-in, a browser helper object, via a standard interface to a web client, or via a proprietary interface to a web client. According to one or more embodiments, request initiator module 152 may create a hidden inline frame (iframe) in a browser document which may be used to monitor content. Once an iframe or other structure in a browser is instantiated to monitor content, content monitoring may be performed by content scanner module 154.

Content scanner module 154 may scan one or more portions of cloud based content using a hidden iframe. This may enable monitoring of secure content using an authenticated, authorized, or otherwise secure session established by a user. Content scanner module 154 may use a hidden inline frame to monitor a current session without requiring a user's credentials, and/or explicit or periodic authorization of a user. Content scanner module 154 may be platform and destination site independent (e.g., it may be used on a variety of browsers on different operating systems and may be used to monitor sessions of different destination websites or content providers.) By using a current session of a user to scan content, content scanner module 154 may avoid problems with security software which may prevent monitoring of secure content in a separate session using the same authentication.

Content scanner module 154 may be capable of obtaining secure cloud based content from any URL, URI, network path, and/or network address to which a browser is authorized and/or authenticated regardless of a web page or network address currently being accessed by a user. For example, a user may navigate to a social networking site and access content associated on a settings page of the user even though a user may not have requested that page or currently be accessing that page. Content scanner module 154 may also access other pages on other sites that do not require authentication or for which authentication has previously been provided. Content scanner module 154 may scan using a hidden iframe and thus scanning actions may not be readily apparent or visible to a user.

According to some embodiments, content scanner module 154 may scan periodically, based on usage (e.g., time connected to a particular site, an amount of data downloaded from a particular site), or using other metrics. This may minimize an impact on a user's network performance by preventing a scan of potential pages when a browser is authenticated to a particular site. According to some embodiments, content scanner module 154 may access a log indicating the last time a particular site has been scanned and may determine whether a site needs to be scanned. According to at least one embodiment, content scanner module 154 may provide a URL, URI, or another network address indicator to a remote host, which may log the information and may send specific instructions or actions if a scan is desired. Content scanner module 154 may also receive an alert if a remote host identifies a vulnerability or security threat associated with a network site, and may response module 158 may perform one or more actions in response (e.g., begin a scan if currently connected, perform a virus scan, etc.). Alerts sent by a remote host may include an alert sent by a security software provider to one or more clients who have previously logged a visit to a site associated with the alert.

Content scanner module 154 may identify a content provider and/or website associated for which one or more actions are provided. For example, the content provider may be a social networking site, an online gaming site, an e-commerce site, or another website for which content scanner module 154 contains or accesses one or more specific instructions. Content scanner module 154 may detect a browser requesting a URL, a URI, or another network address. Content scanner module 154 may use a portion of the network address to query, retrieve, or otherwise access specific instructions (e.g., content scanner module 154 may detect that facebook or another website has been requested and may use one or more portions of a URL of the request to look for specific instructions for that particular site.)

Response module 158 may perform one or more specified instructions or actions, which may include collecting secure content specific to the identified content provider. Specified actions may include collecting profile information from a social networking site, collecting age information from a social networking site, collecting lists of friends, collecting chat conversations, blocking a communication, blocking an action, logging an action, and/or providing a notification. Response module 158 may be capable of emulating a user action such as for example, uninstalling a user application, unsubscribing from a list, unsubscribing from a group, blocking a communication, modifying a privacy setting, modifying an access setting, modifying a friends list, and/or modifying a contacts list.

According to some embodiments, content scanner module 154 may identify a content provider and/or one or more specified actions to be performed using a site signature. A site signature may provide one or more content provider site identifiers and one or more actions. According to some embodiments, site signatures may contain lists of supported portals (e.g., Facebook, myspace, gmail, yahoo, etc.). Site signatures may use regular expressions (e.g., string matching) and matching URIs, URLs, or other network addresses, network paths, or portions of network addresses. Site signatures may be structured in different data formats (e.g., XML). Site signatures may also include specific instructions for content scanner module 154 to perform at a specific site or a specific address of a specific site. Site signatures may use one or more formats to provide actions for a specific site (e.g., XSLT and/or XPATH). Site signatures may be handled by signature handling module 156.

According to some embodiments, signature handling module 156 may receive one or more site signatures from a remote host (e.g., signature management module 142). For example, content scanner module 154 may detect a URI being requested by a browser and signature handling module 156 may query a host or data source for one or more specific instructions (e.g., transmit a site identifier such as a URI to a remote host to receive a corresponding site signature).

Data may be logged by content scanner module 154 and/or provided to a remote host. For example, content scanner module 154 may determine that a child's social networking site is being accessed and may log one or more settings (e.g., collecting age information from settings, collecting lists of friends, collecting chat conversations, etc.). This logged information may be provided to a remote host (e.g., a security website provided by a security software provider, a connectivity provider, an employer, a school, etc.) for analysis and/or notification. A parent, guardian, employer, administrator, or other authorized user may be able to monitor or be notified of security concerns, objectionable content, and/or other specified issues. A parent, guardian, or other authorized user may select or customize a policy providing one or more settings governing use of one or more network sites (e.g., allowing only content with a certain rating).

According to some embodiments, signature handling module 156 may be capable of receiving a series of instructions associated with a site. For example, a first set of instructions associated with a particular site may include scanning for installed social networking applications and providing identifiers of the installed applications to a network address (e.g., a remote host) for rating. If an installed application is rated as a security threat or as containing objectionable content, instructions may be provided to response module 158 to emulate a user action (e.g., using an iframe of the browser) to uninstall the application.

One or more modules of a client may perform actions even if a particular destination site of a browser is not identified. Actions may include identifying content matching one or more of a malware signature, a blacklisted network address, and/or a footprint. Other actions may include reputation based analysis, objectionable content restrictions, and/or behavioral analysis.

According to some embodiments in the event content accessed by a browser is associated with an unknown site (e.g., the cloud based content is associated with a content provider for which no specified actions are provided) one or more portions of the cloud based content may be provided to a remote host for analysis.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, secure cloud based content monitoring module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
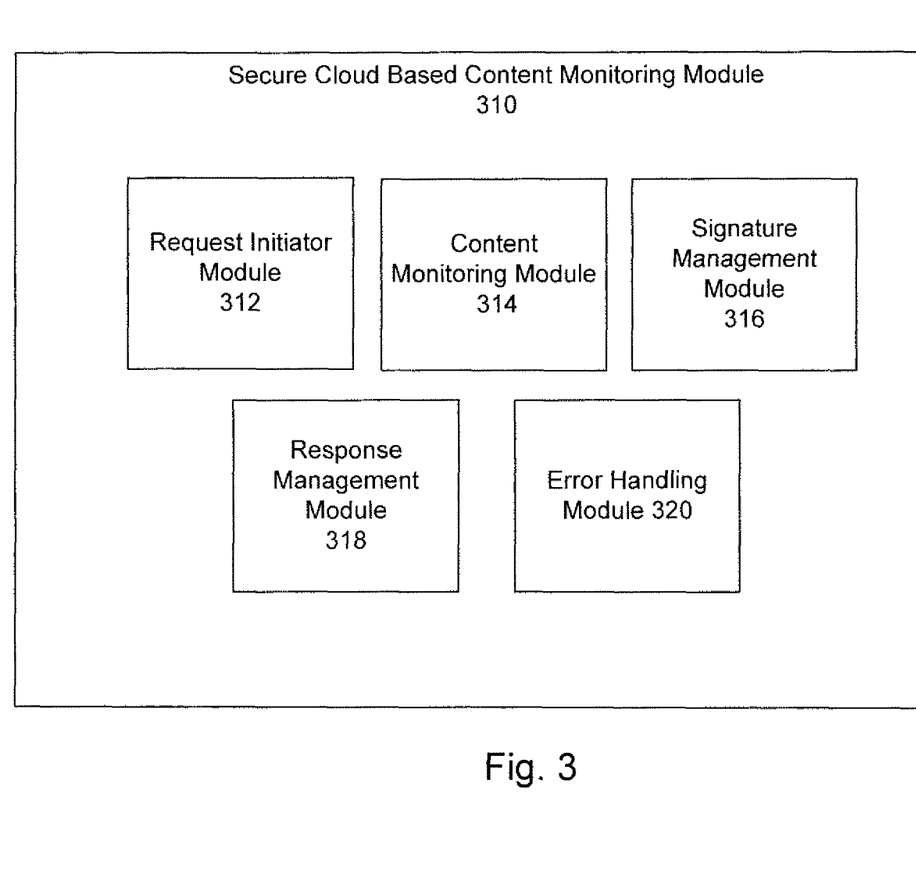
FIG. 3 shows a module for monitoring cloud based content in accordance with an embodiment of the present disclosure.

Referring to FIG. 3, there is shown a secure cloud based content monitoring module 310 in accordance with an embodiment of the present disclosure. As illustrated, the secure cloud based content monitoring module 310 may contain one or more components including request initiator module 312, content monitoring module 314, signature management module 316, response management module 318, and logging and reporting module 320.

Request initiator module 312 may begin a process of scanning secure cloud based content. According to some embodiments, Request initiator module 312 may be implemented using a browser plug-in, a browser helper object, or via another standard interface to a web client. According to one or more embodiments, Request initiator module 312 may create a hidden inline frame (iframe) in a browser document which may be used to monitor content. Once an iframe or other structure in a browser is instantiated to monitor content, content monitoring may be performed by content monitoring module 314.

Content monitoring module 314 may scan one or more portions of cloud based content using a hidden iframe. This may enable monitoring of secure content using an authenticated, authorized, or otherwise secure session establish by a user. Content monitoring module 314 may use a hidden inline frame to monitor a current session without requiring a user's credentials, and/or explicit or periodic authorization of a user. Content monitoring module 314 may be platform and destination site independent (e.g., it may be used on a variety of browsers on different operating systems and may be used to monitor sessions of different destination websites or content providers.) By using a current session of a user to scan content, Content monitoring module 314 may avoid problems with security software which may prevent monitoring of secure content in a separate session using the same authentication.

Content monitoring module 314 may be capable of obtaining secure cloud based content from any URL, URI, network path, and/or network address to which a browser is authorized and/or authenticated regardless of a web page or network address currently being accessed by a user. For example, a user may navigate to a social networking site and access content associated on a settings page of the user even though a user may not have requested that page or currently be accessing that page. Content monitoring module 314 may also access other pages on other sites that do not require authentication or for which authentication has previously been provided. Content monitoring module 314 may scan using a hidden iframe and thus scanning actions may not be readily apparent or visible to a user.

Signature management module 316 may receive one or more specified actions to be performed using a site signature. A site signature may provide one or more content provider site identifiers and one or more actions. According to some embodiments, site signatures may contain lists of supported portals (e.g., Facebook, myspace, gmail, yahoo, etc.). Site signatures may use regular expressions (e.g., string matching) and matching URIs, URLs, or other network addresses, network paths, or portions of network addresses. Site signatures may be structured in different data formats (e.g., XML). Site signatures may also include specific instructions for content monitoring module 314 and/or response management module 318 to perform at a specific site or a specific address of a specific site. Site signatures may use one or more formats to provide actions for a specific site (e.g., XSLT and/or XPATH). Site signatures may be handled by signature management module 316.

According to some embodiments, Signature management module 316 may be capable of receiving a series of instructions associated with a site.

Response management module 318 may perform one or more specified instructions or actions, which may include collecting secure content specific to the identified content provider. Specified actions may include collecting profile information from a social networking site, collecting age information from a social networking site, collecting lists of friends, collecting chat conversations, blocking a communication, blocking an action, logging an action, and/or providing a notification. Response management module 318 may be capable of emulating a user action such as for example, uninstalling a user application, unsubscribing from a list, unsubscribing from a group, blocking a communication, modifying a privacy setting, modifying an access setting, modifying a friends list, and/or modifying a contacts list.

Error handling module 320 may handle one or more errors associated with monitoring secure cloud based content.

Figure 4:
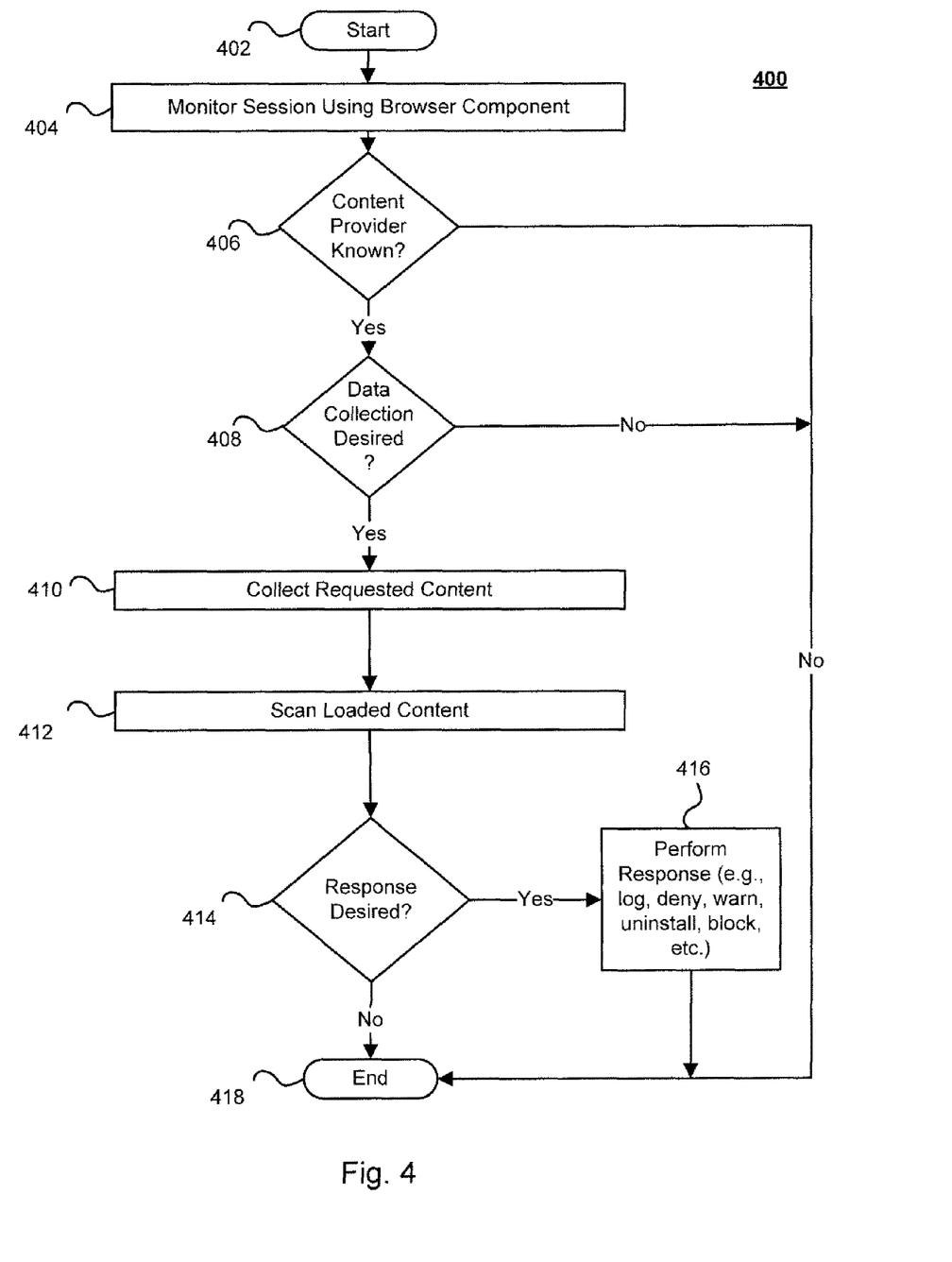
FIG. 4 depicts a method for monitoring cloud based content in accordance with an embodiment of the present disclosure.

Referring to FIG. 4, there is depicted a method 400 for monitoring cloud based content in accordance with an embodiment of the present disclosure. At block 402, the method 400 may begin.

At block 404, a browser or other internet access tool may be monitored using a component or interface of the tool (e.g., a plug-in, a browser helper object, a toolbar. According to some embodiments, access may be monitored using a hidden inline frame (iframe) inserted into an HTML document of the tool. This may allow access to secure content authorized by a session of the tool (e.g., access to content of a website logged into by a user of a browser). Monitoring may include obtaining URLs, URIs, network addresses and other information associated with requests made by a browser. This network access information may be parsed to provide one or more content provider indicators (e.g., an identifier associated with a gaming site or a chat site).

At block 406 one or more network access request indicators may be used to determine if a content provider is known (e.g., a URI may be used to query a local or remote source to identify a content provider). If a content provider is known the method may continue at block 408. If a content provider is not known the method may end at block 418.

At block 408, the method may determine whether data collection is desired. This may include collection of data on at a network location other than a location requested by a user of a browser (e.g., a user may navigate to a chat page of a social networking site and data collection may be performed on a profile or settings page of the social networking site). This may be based at least in part on a log or other information indicating a last time a particular content provider was scanned for a particular user. Scanning may occur based on usage, based on periodic intervals, every time a user connects to a particular site or using other metrics. If scanning is desired the method may continue at block 414. If scanning is not desired, the method may end at block 418.

At block 410, requested content may be collected. According to some embodiments, site signatures may be used which may provide specific network paths and/or types of content to collect for a particular network site.

At block 412, collected content may be logged, provided to a remote host, rated, and/or analyzed using one or more metrics, policies, or specified settings. Loaded content (i.e., content requested by a user of a browser) may also be logged, rated, and/or analyzed.

At block 414 it may be determined whether one or more actions are desired. If one or more actions are desired the method may continue at block 416. If no actions are desired, the method may end at block 418.

At block 416, one or more actions may be performed. Actions may include collecting profile information from a social networking site, collecting age information from a social networking site, collecting lists of friends, collecting chat conversations, blocking a communication, blocking a user action, logging a user action, and/or providing a notification. Actions may also include uninstalling a user application, unsubscribing from a list, unsubscribing from a group, blocking a communication, modifying a privacy setting, modifying an access setting, modifying a friends list, and/or modifying a contacts list.

At block 418, the method 400 may end.

At this point it should be noted that monitoring cloud based content in accordance with the present disclosure as described above typically involves the processing of input data and the generation of output data to some extent. This input data processing and output data generation may be implemented in hardware or software. For example, specific electronic components may be employed in a cloud based content monitoring module or similar or related circuitry for implementing the functions associated with monitoring cloud based content in accordance with the present disclosure as described above. Alternatively, one or more processors operating in accordance with instructions may implement the functions associated with monitoring cloud based content in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for monitoring secure cloud based content comprising:
   monitoring, using a browser component of a browser comprising an iframe, a secure session accessing cloud based content, wherein the monitoring comprises concurrently accessing from the browser cloud based content other than cloud based content requested by a user of the browser;
   identifying specific cloud based content meeting a specified criteria; and
   performing, via a response component, a specified action based at least in part on the identified specific cloud based content, wherein the specified action comprises emulating a user action in the browser.

2. The method of claim 1, wherein the browser component monitors the secure session by creating a hidden inline frame in a Web document of the browser.

3. The method of claim 1, wherein the monitoring is performed without periodic authorization of a user of the browser.

4. The method of claim 1, wherein the monitoring of the secure session is performed using a same connection created by a user of the browser.

5. The method of claim 1, wherein the browser component comprises a browser plug-in.

6. The method of claim 1, wherein identifying content meeting a specified criteria comprises identifying content matching one or more of: a malware signature, a blacklisted network address, a footprint, reputation based analysis, objectionable content restrictions, and behavioral analysis.

7. The method of claim 1, wherein identifying specific content meeting a specified criteria comprises identifying a content provider for which one or more specified actions are provided.

8. The method of claim 7, wherein the content provider comprises at least one of: a social networking site, an online gaming site, and an e-commerce site.

9. The method of claim 7, wherein the specified action comprises collecting secure content specific to the identified content provider.

10. The method of claim 7, wherein the one or more specified actions comprise at least one of collecting profile information from a social networking site, collecting age information from a social networking site, collecting lists of friends, collecting chat conversations, blocking a communication, blocking an action, emulating a user action, logging an action, and providing a notification.

11. The method of claim 10, wherein emulating a user action comprises at least one of uninstalling a user application, unsubscribing from a list, unsubscribing from a group, blocking a communication, modifying a privacy setting, modifying an access setting, modifying a friends list, and modifying a contacts list.

12. The method of claim 7, wherein identification of a content provider with one or more specified actions is performed using a site signature, the site signature providing one or more content provider site identifiers and one or more actions.

13. The method of claim 12, further comprising receiving one or more site signatures from a remote host.

14. The method of claim 7, wherein the one or more specified actions include logging secure cloud based content and providing one or more portions to a remote host.

15. The method of claim 1, wherein the specified action is specified by at least one of: a parent, a guardian, and an administrator.

16. The method of claim 1, wherein the monitoring is performed at least one of: periodic intervals and based on usage.

17. The method of claim 1, wherein the specific cloud based content is associated with a content provider for which no specified actions are provided and one or more portions of the specific cloud based content are provided to a remote host for analysis.

18. At least one non-transitory processor readable storage medium for storing a computer program of instructions configured to be readable by at least one processor for instructing the at least one processor to execute a computer process for performing the method as recited in claim 1.

19. An article of manufacture for monitoring secure cloud based content, the article of manufacture comprising:
   at least one non-transitory processor readable storage medium; and
   instructions stored on the at least one non-transitory processor readable storage medium;
   wherein the instructions are configured to be readable from the at least one medium by at least one processor and thereby cause the at least one processor to operate so as to:
      monitor, using a browser component of a browser comprising an iframe, a secure session accessing cloud based content, wherein the monitoring comprises concurrently accessing from the browser cloud based content other than cloud based content requested by a user of the browser;
      identify cloud based content meeting a specified criteria; and
      perform, via a response component, a specified action based at least in part on the identified specific cloud based content, wherein the specified action comprises emulating a user action in the browser.

20. A system for monitoring secure cloud based content comprising:
   one or more processors communicatively coupled to a network; wherein the one or more processors are configured to:
      monitor, using a browser component of a browser comprising an iframe, a secure session accessing cloud based content, wherein the monitoring comprises concurrently accessing from the browser cloud based content other than cloud based content requested by a user of the browser;

identify cloud based content meeting a specified criteria; and perform, via a response component, a specified action based at least in part on the identified specific cloud based content, wherein the specified action comprises emulating a user action in the browser.

* * * * *